(12) United States Patent
Walthert et al.

(10) Patent No.: US 8,485,324 B2
(45) Date of Patent: Jul. 16, 2013

(54) DAMPER DEVICE FOR A TWO-WHEELED VEHICLE

(75) Inventors: Martin Walthert, Aarberg (CH); Stefan Battlogg, St. Anton I.M. (AT); Gernot Elsensohn, St. Anton I.M (AT)

(73) Assignee: DT Swiss Inc., Grand Junction, CO (US)

( * ) Notice: Subject to any disclaimer, the term of this patent is extended or adjusted under 35 U.S.C. 154(b) by 252 days.

(21) Appl. No.: 12/977,638

(22) Filed: Dec. 23, 2010

(65) Prior Publication Data

US 2012/0085606 A1    Apr. 12, 2012

(30) Foreign Application Priority Data

Dec. 23, 2009  (DE) .......................... 10 2009 060 550

(51) Int. Cl.
*F16F 9/53* (2006.01)
(52) U.S. Cl.
USPC ........................................................ 188/267.2
(58) Field of Classification Search
USPC .................... 188/267.2, 267, 322.15, 322.22, 188/282.1, 269
See application file for complete search history.

(56) References Cited

U.S. PATENT DOCUMENTS

| | | | |
|---|---|---|---|
| 6,131,709 A * | 10/2000 | Jolly et al. ................. | 188/267.2 |
| 6,471,018 B1 | 10/2002 | Gordaninejad | |
| 2004/0134728 A1* | 7/2004 | Lisenker et al. ........... | 188/267.2 |
| 2004/0154887 A1 | 8/2004 | Nehl | |
| 2006/0118370 A1* | 6/2006 | Izawa et al. ................ | 188/267.2 |

FOREIGN PATENT DOCUMENTS

| | | |
|---|---|---|
| DE | 935831 B | 12/1955 |
| DE | 4243837 A1 | 6/1994 |
| DE | 4433056 A1 | 3/1996 |
| DE | 10214357 A1 | 10/2003 |
| DE | 10240568 A1 | 3/2004 |
| DE | 102004052573 A1 | 5/2006 |
| DE | 60114584 T2 | 7/2006 |
| DE | 112004002264 T5 | 10/2006 |
| DE | 102006033565 A1 | 1/2008 |
| DE | 112007001932 T5 | 7/2009 |

OTHER PUBLICATIONS

Search Report in German Patent Application No. DE 10 2009 060 550 by German Patent and Trademark Office.

* cited by examiner

*Primary Examiner* — Melanie Torres Williams
(74) *Attorney, Agent, or Firm* — Greer, Burns & Crain, Ltd.

(57) ABSTRACT

A damper device for a two-wheeled vehicle and a corresponding method are provided wherein a first damper chamber and a second damper chamber are coupled to one another through at least one flow duct. A ferromagnetic fluid is provided in the flow duct. A magnetic device is assigned to the flow duct to allow exposing at least part of the flow duct to a magnetic field. A magnetic field-generating device is provided wherein a permanent changing of the magnetic field strength of the magnetic device can be carried out through magnetic pulses. In this way, the damper only requires energy for adjusting the damping, normal operation may occur without an external energy supply.

15 Claims, 6 Drawing Sheets

DAMPER DEVICE FOR A TWO-WHEELED VEHICLE

BACKGROUND

The present invention relates to a damper device for a two-wheeled vehicle and in particular for a bicycle, which bicycle may be equipped with an auxiliary drive. The damper device may for example serve as a rear wheel damper or be part of, or be configured as, a suspension fork.

Many different types of rear wheel dampers and suspension forks for bicycles have become known in the prior art. Typically a damping unit for a rear wheel of a bicycle comprises at least one spring for cushioning shocks, and a damper for damping spring vibrations.

Most dampers for bicycles are operated with a damping fluid such as oil. For damping, the damping fluid is conveyed from a first damping chamber to a second damping chamber through a valve gate throttling the flow. The size of the valve gate aperture determines the damping strength. For application in bicycles it is desirable to have a load-sensitive damping level regulation. Thus for example slight damping may be provided for weak shocks and stronger damping for heavy shocks.

An optimal damping is also dependent on the terrain characteristics. Thus, for rides over roads, on forest paths or off-road, different damping settings are optimal.

For adjusting and influencing damping, ferromagnetic fluids have become known whose characteristics can be influenced by means of applying a magnetic field. Ferromagnetic fluids tend to consist of a suspension of minuscule particles which can be magnetically polarized and which are finely dispersed in a carrier liquid. The polarizable particles tend to consist of carbonyl ferrous powder and their diameters are typically between 0.1 and 50 micrometers, forming chain-like structures under the influence of a magnetic field such that the ferromagnetic fluid viscosity will considerably rise under the influence of a magnetic field in particular perpendicular to the field lines of the magnetic field.

As the magnetic field is switched off, the viscosity will drop virtually instantaneously. Examinations have shown that the typical response time lies in the range of a few milliseconds or even less. Thus, ferromagnetic fluids are suitable to be used in dampers of bicycles.

With U.S. Pat. No. 6,471,018 B1, a ferromagnetic damper has become known in which an electromagnet exposes a flow passage between the first and the second damper chambers to a magnetic field to set the desired damping level. One advantage of such a damper is that the chain-forming of the ferromagnetic particles can be controlled through the magnetic field strength. Setting the strength of an electromagnet is simple such that a flexible system is provided. The drawback of the known system in particular when used in bicycles is, however, that the electromagnet needs to be supplied with electric energy at all times during operation to ensure the desired damping characteristics. The continuous power requirement is a drawback in particular when used in bicycles since in the case of commercially available batteries either the operating time will decrease or the extra weight of power supply will increase.

To reduce the electric energy required it has thus become known to employ a permanent magnet in combination with an electromagnet wherein the permanent magnet generates a desired basic magnetic field strength which is modulated by the electromagnet as desired. Thus, with a suitable circuit arrangement of the electromagnet the magnetic field acting in the ferromagnetic operating gap may intensify or else be attenuated while the electromagnet is in operation. This system, however, still continuously requires electric energy for each setting deviating from the normal settings such that the functional range of the bicycle is again limited. The more the selected operational point deviates from the normal settings fixedly specified by the permanent magnet, the more energy will be required.

What is aggravating when employed as a bicycle damper is that various damper operating modes having different requirements such as "lockout" or "weak platform" may prevail for long periods. "Lockout" designates the mechanism of a suspension fork blocking the damper, while "platform" is understood to mean various characteristic damper curves. A damper optimized by way of permanent magnets for low energy absorption in one specific operating mode (e.g. medium platform) inevitably consumes conspicuously more energy in other operational modes (e.g. lockout).

SUMMARY

It is therefore the object of the present invention to provide a ferromagnetic damper for a bicycle which can be flexibly set and/or adjusted without involving continuous energy consumption.

The damper device according to the invention for a two-wheeled vehicle and in particular a bicycle comprises at least one first damper chamber and at least one second damper chamber coupled to one another through at least one flow connection or a flow duct. A ferromagnetic fluid is provided in the flow duct.

At least one magnetic device is provided to expose at least part of the flow duct to a magnetic field.

Furthermore at least one magnetic field-generating device is provided by means of which a permanent setting and/or changing of the magnetization of the magnetic device can be carried out.

The damper device according to the invention has many advantages. A quite considerable advantage of the damper device according to the invention is the option of changing the magnetic field strength of the magnetic device or of the magnet through magnetic pulses of the magnetic field-generating device. This allows for example by way of only one short-term pulse to permanently change the magnetic characteristics of the magnetic device. The short-term magnetic pulse requires energy for a short time only while subsequently the magnetic field strength of the magnetic device is permanent. The magnetic field strength thus set is present for a considerably longer duration than is the duration of the pulse.

The ratio of the duration of the permanent change of magnetization to the duration of the magnetic pulse is in particular above 10 and as a rule above 100 and may basically be very much higher still, far exceeding a factor of 1000000. The duration for which the newly set magnetization or magnetic field strength is maintained usually persists until the next intentional change. For this duration the damper device is fully operational as is a conventional damper. In the case of a normal prior art damper the response reaction is not changed once every 1/10 seconds but only as conditions change, for example transferring from road to off-road or the like. This damper device according to the invention only requires current for a short time, when the damping characteristics are to be changed. Following the setting of magnetization by one or more magnetic pulses the new magnetization is retained as the normal setting until another change of the normal setting is desired.

In this way the damper only requires energy for adjusting the damping, normal operation may occur without external energy supply.

The invention also allows frequent changes and adjusting of the magnetic field strength of the magnetic device without continuously requiring energy therefor. Supply of energy is only required for changing the setting. This also allows setting an emergency operating mode (emergency magnetic field) in case that the supply voltage reaches a bottom threshold level.

The magnetic device preferably comprises at least one permanent magnet. In the sense of the present application the term "magnet" is understood to mean a permanent magnet. The magnet is at least part of the magnetic device. The magnetic device comprises all of the components which generate the magnetic field and are conductive in the magnetic circuit of the damper. By way of the magnetic field-generating device the magnetic properties of the magnetic device and thus of the permanent magnet or magnet are set permanently. "Permanent" in the sense of the present application is a duration which is multiple times longer than the duration of the magnetic pulse. This means in particular periods of at least several seconds, minutes, hours, days, or longer. The set characteristics are in particular not required to remain the same indefinitely but they may be subjected to natural aging or attenuating phenomena so as to require refreshing at periodic intervals.

The magnetic field generated by the magnetic device acts without energy supply and maintains the generated magnetic field permanently as long as it is not influenced by external circumstances such as other magnetic fields, temperature effects, natural aging or attenuating processes. For example as the Curie temperature is reached, the magnetic field will drop sharply.

Preferably the magnetic field-generating device comprises at least one electric coil or an electromagnet or is configured as a coil. An electric coil is particularly suitable as a magnetic field-generating device since a coil can generate strong magnetic fields in a short time and adjusting may occur purely electrically. The term "coil" will be used below to mean a magnetic field-generating device.

An electric coil is preferably used which by way of a current pulse generates a magnetic pulse which superimposes the magnetic device field. Depending on the strength of the pulse, magnetization of the magnetic device may be intensified, attenuated, neutralized, or its polarity reversed. Below, the magnetic field-generating device will be simply referred to as a coil, however other methods such as a correspondingly strong permanent magnet may be employed.

A preferred damper device according to the invention is provided for a two-wheeled vehicle and in particular a bicycle and comprises at least one first damper chamber and at least one second damper chamber coupled to one another through at least one flow duct. At least one flow duct is provided with a ferromagnetic fluid which can be influenced permanently and absent any energy supply in the flow duct at least in part by the magnetic field of at least one magnetic unit consisting of hard magnetic material at least in part or of a magnet. At least one magnetic field-generating device and in particular at least one electric coil is provided by means of which a permanent change of the magnetic field strength of the magnetic device or the magnet can be effected through magnetic pulses.

It can in particular be possible to intentionally change the magnetic field strength of the magnet by means of the coil and to intentionally set it to a desired value. The value set is between zero and the maximum magnetic remanence of the selected hard magnetic material or between negative and positive remanence as the magnet polarity is changed.

The at least one magnet consists at least in part of at least one hard magnetic material having specific remanence and coercitive field strength. A material having these properties can be magnetized permanently and also demagnetized permanently. The strength of magnetization depends on the strength of the magnetic pulse but basically not on the duration of the magnetic pulse namely, as soon as a specific minimum pulse duration has been reached. The definition of the minimum pulse duration is that period of time after which the magnetizable material reaches a magnetization corresponding to the pulse strength at the time. This is in particular understood to mean that period of time after which the magnetizable material reaches a maximum magnetization corresponding to the pulse strength at the time. After the minimum pulse duration is reached, any extended same strength pulses cease to intensify magnetization. The measure of the magnetic pulse strength used may be the current intensity of the coil or the charging voltage of the capacitor.

This minimum pulse duration is related to multiple factors, for example the structure and the material of the magnetic circuit influences the formation of eddy currents counteracting or delaying changes to the magnetic field. Within the scope of such minimum pulse duration the magnetic pulse strength may be varied by pulse length.

The pulse length of the magnetic pulses is in particular less than 1 minute, preferably the pulse length is less than 10 seconds and particularly preferably less than 1 second. For a permanent change and setting of the magnetization of the magnet, magnetic pulses of a pulse length in the range of a few microseconds may be sufficient wherein subsequently the set magnetization of the magnet is permanently provided for minutes, hours, days, and still much longer durations, until magnetization is changed again with another magnetic pulse. Usually the device for generating the magnetic pulse limits the minimum pulse duration, times in the range of hundredths or tenths of seconds are conceivable as are a few milliseconds or still less.

To neutralize an existing magnetization, an alternating magnetic field with decreasing field strength may be employed. A preferred embodiment employs therefor a damped, electric oscillator circuit. Or else it is conceivable to reduce or neutralize the magnetization of the magnet with a series of separate magnetic pulses of decreasing intensities and at reversed polarities.

An oscillator circuit device may consist of a coil and a capacitor wherein the coil of the magnetic field-generating device may form part of the oscillator circuit device.

In all of the configurations the first damper chamber may be configured as a first damper zone in a shared damper chamber in which the second damper chamber assumes a second damper zone.

A control device is preferably provided for controlled emission of the magnetic coil pulses. Or else a control is conceivable to influence the shape and strength of the generated magnetic field through suitable sensors and at least one coil.

In all of the configurations it is conceivable to additionally influence the preset magnetic field strength of the magnet (permanent magnetic field of the magnetic device) by means of a weak magnetic field (variable magnetic coil field) without thereby changing the permanently set magnetic field strength of the magnet. Either the existing coil or an additional coil may be employed therefor.

This makes sense for example when different operating points are required and each operating point requires slight but continuous or stepped adjustments to always allow optimal or nearly optimal operating conditions.

Advantageously at least one capacitor device is provided to supply at least part of the electric energy for generating at least one magnetic pulse. A capacitor device having one or more electric capacitors is low in weight and requires little space while offering the advantageous option of storing electric energy for one or more magnetic pulses such that even when employing a power source supplying low electric current and/or voltage, a desired magnetic pulse can be triggered after charging the capacitor.

A capacitor device offers the further advantage of electric energy available at all times for triggering a magnetic pulse and thus changing the damping characteristics. The response rate is very high.

Another advantage is that the strength of the magnetic pulse can be determined very precisely through the charging voltage of the capacitor device without varying the pulse length.

In all of the embodiments it is possible for at least one sensor device to be provided. For example a magnetic field sensor may be provided for determining the magnetic field strength in the flow duct or for deriving a measure for the magnetic field strength in the flow duct. Physical magnitudes directly related to the magnetic field may be captured and the magnetic field be determined therefrom. It is also conceivable to employ other sensors such as temperature sensors. Moreover, force, pressure, distance, or acceleration sensors may be employed for obtaining data for controlling and regulating.

Preferably the flow duct is configured as a flat gap or comprises a flat gap which may be straight or else curved. The gap width is preferably relatively narrow in the direction of the possible magnetic field and the transverse gap length, relatively long. Thus the ratio of gap length to gap width is preferably above 2 and in particular above 5. The gap width is in particular beneath 5 mm and preferably beneath 2 mm. Since the magnetic field applied is attenuated in the flow duct, narrow gap widths are advantageous.

Gap widths in the range from 0.5 to 1 mm have been found to be advantageous where in specific applications ranges from 0.1 to 10 mm or else 0.01 to 100 mm are conceivable as well. To achieve a large adjustment range in the smallest possible mounting space, multiple single gaps may be employed. The magnetic circuit may be kept small with single gaps being located on top of one another (serial in the magnetic circuit). Although the cross-sectional area subjected to the magnetic flux of the magnetic field does not change with the number of gaps, the field strength needs to be adapted to the sum of the single gap widths.

The gap length is substantially dependent on the maximum of the achievable counterforce and the flow rate. The chain formation of the particles in the magnetic field takes a certain time (dwell time, usually less than 1 ms). During this time the counterforce corresponding to the magnetic field builds up. When the gap length is shorter than the product of dwell time and flow rate then the particles bypass the gap before the chain formation is complete. However, the achievable counterforce drops noticeably, the system does not operate efficiently.

In all of the configurations and more specific embodiments the magnet in particular consists at least in part of such a material and is structured such that a magnetic flux density of at least 0.3 tesla and in particular of at least 0.5 tesla can be generated in the flow duct. This does not mean that this flux density must be set at all times but only that, given a maximum possible magnetic field strength of the magnet, it must be possible to generate the indicated magnetic remanence in the flow duct. The magnetic remanence is in particular at least 0.5 and in particular 0.8 tesla.

By structural measures for example a collimation of the magnetic field lines can be achieved so as to enable a still higher flux density in the gap or the flow duct. The ratio of the flux densities in the magnet or in the flow duct may be influenced through the ratio of the areas under magnetic flow.

Advantageously the magnet consists at least in part of a material having a coercitive field strength of above 1 kA/m (=1 000 ampere/meter) and in particular above 5 kA/m and preferably above 10 kA/m. Coercitive field strengths of 30, 40 or 50 or else 100 or 150 kA/m are in particular conceivable as well.

Particularly preferably the magnet or the magnetic device consists at least in part of a material having a coercitive field strength of less than 1000 kA/m (=1,000,000 ampere/meter) and preferably less than 500 kA/m and particularly preferably less than 200 kA/m. The coercitive field strength lies particularly preferably in a range between 10 kA/m and 200 kA/m.

This means that the magnetic device can on the one hand generate a high magnetic field strength in the provided magnetic circuit while on the other hand the energy required for remagnetization does not increase too much.

Preferably the magnetic device consists at least in part of a material such as alnico or a material having similar magnetic properties such as FeCrCo, FeCoVCr, or CuNiFe. Alnico or a similar material is particularly preferably used. Alnico is an alloy of aluminum, nickel and cobalt, and may include other elements such as iron or copper. Permanent magnets can be made of alnico usually having a remanence of 0.7 to 1.2 T and a coercitive field strength of 30 to 150 kA/m or higher.

Alnico magnets have comparably high coercitive field strengths and correspondingly oppose any external magnetic fields with high resistance such that remagnetization or demagnetization is not achieved in a closed magnetic circuit by means of normal fields occurring naturally. On the other hand the coercitive field strength is relatively low compared e.g. to neodymium such that an electromagnet or an electric coil allows demagnetization applying relatively low energy levels.

Another advantage of AlNiCo is the course of the demagnetization curve (2nd quadrant in the BH diagram), the high thermal stability and the good chemical properties relative to other usual magnetic materials.

When the damper is in lockout mode, then piston movement must be prohibited at any force beneath a defined lockout force. To this end the flow of the ferromagnetic fluid is blocked through the most homogeneous magnetic field in the flow duct possible. In this case a configuration of the flow duct as a flat gap is most advantageous.

In normal damping operation it is preferred that the flow duct can be exposed to an inhomogeneous magnetic field. The inhomogeneity of the magnetic field across the flow duct preferably has a ratio from the largest to the smallest field strength of above 10 and in particular of above 100 or even above 1000. Due to the inhomogeneity the flow duct may be normally subdivided into various sections in the direction of the flowing medium by way of the field strength. Areas having no or only a very weak field are designated as bypass areas and areas having a strong field, as blocking areas. The areas lying in-between are the transition areas in which the field strength increases from a low to a higher value.

Preferably the flow duct comprises at least one transition section and at least one blocking section and/or at least one bypass section. The field strength ratio in the blocking section to the bypass section is in particular above 10 and particularly preferably above 100. The field strength ratio of the transition section to the bypass section is in particular above 5 and preferably above 10. Transition between individual sections may be fluent. Or else, mechanical separation between sections e.g. by partition walls is possible.

By way of a bypass section, zero passage of the force-speed curve is intended in which an idle piston starts moving under small or minute forces, thus damping shocks. Such a zero passage of the force-speed curve can be ensured by a bypass section.

With slow speeds the ferromagnetic fluid flows through the bypass only. As speed increases, pressure loss in the bypass increases until a critical value is reached at which the shear stresses of the ferromagnetic fluid in the blocking section of the flow duct are reached and exceeded. From this differential pressure upwardly the ferromagnetic fluid flows not only in the bypass section but in the entire flow duct. Due to this the pressure rises more slowly as the speed continues increasing. The system, however, entails a break point in the rising characteristics if the ferromagnetic fluid flows through the blocking section beyond a fixed differential pressure. With shock absorbers at bicycles a smooth transition from the "low speed" to the "high speed" range is aimed at to allow comfortable riding properties. To this end the break point in the pressure-speed curve requires rounding. Only then will a damper provide high riding comfort and increased safety due to better road adhesion.

Presently this can be achieved by providing a transition section having an inhomogeneous magnetic field wherein as the differential pressure increases, individual sections of the transition section allow the ferromagnetic fluid to flow through. As the speed rises, the bypass section extends due to the increasing differential pressure making the transition section shrink, thus the pressure-speed curve drops off increasingly. As was described above, the flow will pass through the blocking section as well above a specific differential pressure with the transition being fluent.

In preferred embodiments a cross-sectional area of the flow duct is adjustable. For example by way of a pushing or rotating movement the available flow duct area may be increased or decreased for setting different damping characteristics. Then the damper may be adjusted not only by way of adjusting the magnetization of the magnet but by way of the size of the cross-sectional area of the flow duct.

Preferably at least a portion of the transition section and/or the bypass section is adjustable at the cross-sectional area of the flow duct.

In particular can the magnetic device or parts thereof be provided movable relative to the flow duct. This allows for example to change the magnetic field strength or the size of the bypass section.

Preferably at least part of the magnet is disposed adjacent to the coil or enveloped in the coil. It is conceivable and preferred for at least part of or the entire magnetic device to abut the coil.

Preferably the coil envelops a core consisting at least in part of a magnet whose magnetization is set by way of the magnetic pulses. With the entire core or magnet enveloped in the coil, it is ensured to be located in the maximum effective coil area to ensure efficiency of changes to magnetization.

Preferably the core, the coil, and the at least one flow duct are enveloped in a magnetically conductive component, the ring conductor. The task of the ferromagnetic ring conductor is to close the magnetic field and to keep any magnetic field losses in the ring conductor low.

Both the ring conductor and the core may consist in part or entirely of alnico or a similar hard magnetic material. By means of magnetic pulses of the coil they are converted, at least in part, to permanent magnets of variable strength.

The flow duct in particular abuts the core, the ring conductor, and at least one lateral, magnetic isolator. It is the task of the magnetic isolator to concentrate the magnetic field lines in the core in the direction of the flow duct or at least to not deflect them such that the magnetic field for influencing the ferromagnetic fluid can be generated in the flow duct substantially perpendicular to the flux direction.

In all of the configurations it is possible for the flow duct to be divided into at least two partial ducts at least in one flow duct by at least one partition wall. One or more partition walls generate e.g. a fan-like structure in the flow duct which allows a particularly efficient damping since the ferromagnetic effect multiplies.

Advantageously the walls consist of a ferromagnetic material to keep the magnetic resistance from the partition walls low. A material having remanence properties such as hard magnetic materials is in particular possible.

In advantageous configurations at least two coils are provided which can in particular be controlled separately to obtain intentional influencing of the magnetic field. Two coils emitting separate magnetic pulses for example allow different magnetization of two different magnets so as to allow to correspondingly adjust the size of a transition section or a bypass section at the flow duct. It is for example possible for a first coil to influence the entire magnetic circuit while a second coil only influences part of the magnetic circuit wherein the resulting magnetic field can be locally intensified or attenuated.

It is also possible for the first coil to adjust the magnetic field in a first flow duct through magnetizing a magnet, and for the second coil to adjust the magnetic field in a second flow duct through magnetizing another magnet. Or else it is conceivable for both coils to act on the same magnet and in this way to control the shape, orientation, and strength of magnetization.

In advantageous configurations an oscillator circuit device is provided for generating an attenuating, alternating magnetic field. An attenuating, alternating magnetic field may serve to adjust and ensure a defined magnetization. Notwithstanding the present polarization and field strength of the magnet, an attenuating, alternating magnetic field may ensure reliable demagnetization so as to provide defined initial conditions for the subsequent adjusting process of the magnetic field strength. By way of a directed controlling of the current intensity of the electric coil a defined magnetic pulse is then generated which due to the remanence of the magnet adjusts a precisely defined field strength in the magnetic device. Preferably the coil itself forms part of the oscillator circuit.

It is for example possible to intentionally demagnetize the magnet of the damper at the beginning of each ride or at specific time intervals to prevent accumulated deviations.

Or else it is possible to firstly demagnetize the magnet prior to each field strength adjustment for setting defined initial conditions.

In all of the configurations it is possible and preferred for the first damper chamber and the second damper chamber to be disposed at least in part in one shared damper housing and separated from one another by at least one damper piston. The damper piston may comprise at least one flow duct which flow duct may be disposed on the exterior of the damper piston or else at least one flow duct passes through the damper piston.

When a flow duct is provided on the exterior of the damper piston, the damper housing may form the ring conductor of the magnetic device. This requires for the damper housing to consist of a magnetically conductive material at least across the section over which the damper housing moves. In applications in which the weight is a major factor it is therefore advantageous for the flow duct or ducts to be provided passing through the damper piston since then the ring conductor itself may form part of the piston so as to enable a low weight.

Preferably the damper piston is received axially displaceably along a longitudinal axis. A connecting axis of the north pole and the south pole of the magnetic device is oriented in particular transverse to the longitudinal axis along which the damper piston is displaceable.

Another damper device according to the invention is provided for a two-wheeled vehicle and in particular a bicycle and comprises at least one first damper chamber and at least one second damper chamber coupled to one another through at least one flow duct which is provided with at least one ferromagnetic fluid. At least one permanent magnet is provided to expose at least part of the flow duct to a magnetic field. At least one magnetic field-generating device is provided by means of which a permanent change of the static magnetic field of the permanent magnet can be achieved, generated, or adjusted by means of at least one magnetic pulse.

The method according to the invention for operating a damper device in particular for a two-wheeled vehicle and in particular for a bicycle is performed by a damper device comprising at least one first and at least one second damper chamber coupled to one another through at least one flow duct. At least one ferromagnetic fluid is provided in the flow duct. At least one magnetic device is assigned to the flow duct to expose the flow duct to a magnetic field of the magnet. The magnetization of the magnet is permanently set and changed through magnetic pulses of a coil.

The method according to the invention also has many advantages since short-term, magnetic pulses allow a permanent setting or adjustment of the magnetic properties of the magnetic device or of the magnet. In this way energy and in particular electric energy is only required as the damping characteristics are to be changed.

Preferably the magnetic pulses are generated through an electric coil which is supplied with the energy required through at least one capacitor.

By means of an oscillator circuit device an intentionally attenuating, alternating magnetic field may be generated for an intentional demagnetization of the magnetic device or the at least one magnet. This allows to establish a normal state from which different magnetic field strengths of the magnet can be adjusted and obtained through corresponding magnetic pulses.

Sensors, regulators, control, one or more capacitor devices, the oscillator circuit device and/or supply, may be disposed at or in the damper.

Advantageously the magnetic pulses for achieving a change of the magnetic field strength of the magnetic device are shorter than 1 second and in particular shorter than 10 milliseconds. Depending on the coil and its supply, pulse times in the region of 1 millisecond or less, in particular in the range of microseconds are conceivable.

In all of the configurations it is preferred for the field strength of the coil that can be generated at the magnet to be higher than the coercitive field strength of the magnetic material. To achieve saturation of the magnet the field strength which the coil can generate should be related to the magnetic material and preferably achieve about five times or more of the value of the coercitive field strength. In this way it is ensured that random magnetization of the magnetic device can be performed.

Preferably at least two magnetic field-generating devices or coils are provided the field strengths of which can be controlled separately to generate a desired local curve of the field of the magnetic device.

In all of the configurations it is possible for the relative position of the magnetic device or its parts to be adjusted relative to the position of the flow duct for example to adjust the size of the bypass section or the transition section.

In particular does a magnetic pulse of the coil allow to permanently store in the magnet the shape and strength of the magnetic field of the magnet.

In preferred configurations individual regions of the magnetic device have different hard magnetic properties, for example due to different materials or different geometries such that, given a corresponding magnetic field of the magnetic field-generating device, sorting in regions having fixed or variable magnetization is possible.

It is possible that by way of utilizing remanence and pulsed operation of a coil which does not require to be live at all times, an advantage in terms of weight and space can be achieved. The wires of the coils can be dimensioned to be thinner and lighter if they are live for short operating periods only. This may result in advantages in terms of weight, space requirement, and costs. A continuously live coil would as a rule have to be equipped with thicker wires etc. to endure the continuous load. The power dissipations occurring in short-term pulses may be buffered in the component itself.

The energy required for operation may be generated by a dynamo or by components converting vibrations to energy or be generated or picked off by other generators.

Or else it is possible for the magnetic field-generating device to be provided external of the damper housing and the magnetic pulses to act through the cylinder wall of the damper housing and to act on the magnetic device in the interior of the damper housing.

BRIEF DESCRIPTION OF THE DRAWINGS

Other advantages and characteristics of the present invention can be taken from the exemplary embodiment which will be described below with reference to the accompanying FIGS. 1 to 9.

The figures show in.

DETAILED DESCRIPTION

With reference to the enclosed FIGS. 1 to 9, an embodiment of the invention will be described by way of a damper device 1 for a bicycle. The damper device 1 is presently configured as a rear wheel damper, comprising a first end 39 and a second end 40 which are indirectly or immediately connected with the frame or the rear wheel.

Other configurations may provide for a suspension fork to be provided with a corresponding damper device 1.

Figure 1:
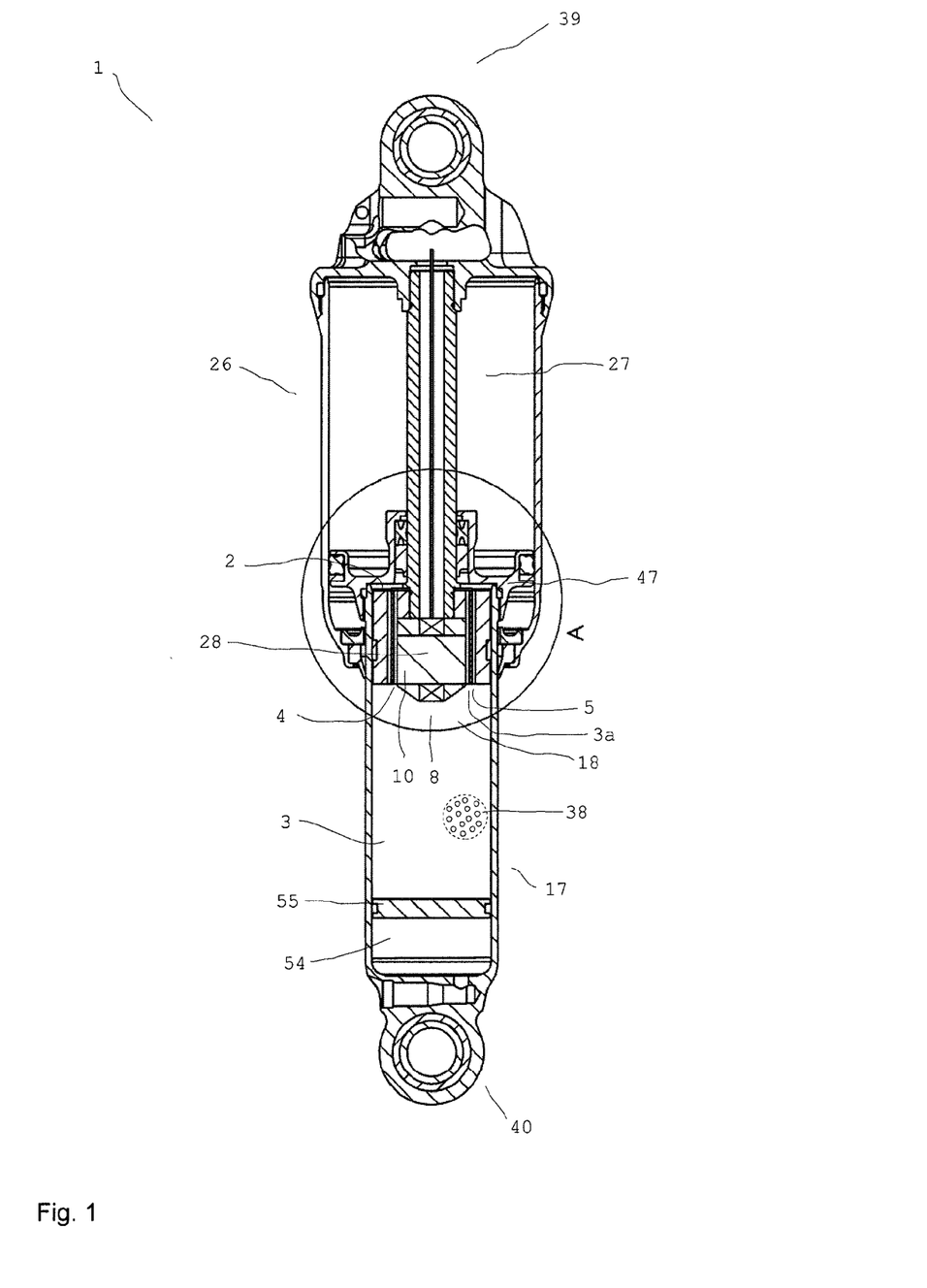
FIG. 1 a schematic, sectional side view of a damper device according to the invention in the normal position.

The damper device 1 shown in a section in FIG. 1 comprises a damper which presently comprises a first damper chamber 2 and a second damper chamber 3 which are separated from one another by a damper piston 18. Flow ducts 4 and 5 are provided in the damper piston 18 as flow connections 6 which presently serve for damping in the compression stage and in the rebound stage.

Both the first damper chamber 2 and the second damper chamber 3 and the flow ducts 4 and 5 are presently filled with a ferromagnetic fluid 38 containing ferromagnetic particles such as carbonyl ferrous powder in a carrier liquid. The carrier liquid is preferably oil-based with additives such as stabilizers, antifreeze agents, abrasion and viscosity improvers. The ferromagnetic fluid 38 is illustrated simplistically in FIG. 1 in a detail.

The damper piston 18 presently serves as a valve 20 with which to control the flow of the ferromagnetic fluid 38 from the first damper chamber 2 to the second damper chamber 3 through the flow ducts 4 and 5.

A piston rod 27 is located after the damper piston 18, extending through a spring device 26 presently configured as a pneumatic spring. The spring device 26 comprises a first spring chamber 41 and a second spring chamber 42, separated by a piston or a gas piston 47.

The first end 39 may be provided with an adjusting device e.g. for making changes to the spring characteristics. The adjusting device may comprise e.g. rotary units as the adjusting elements.

Figure 5:
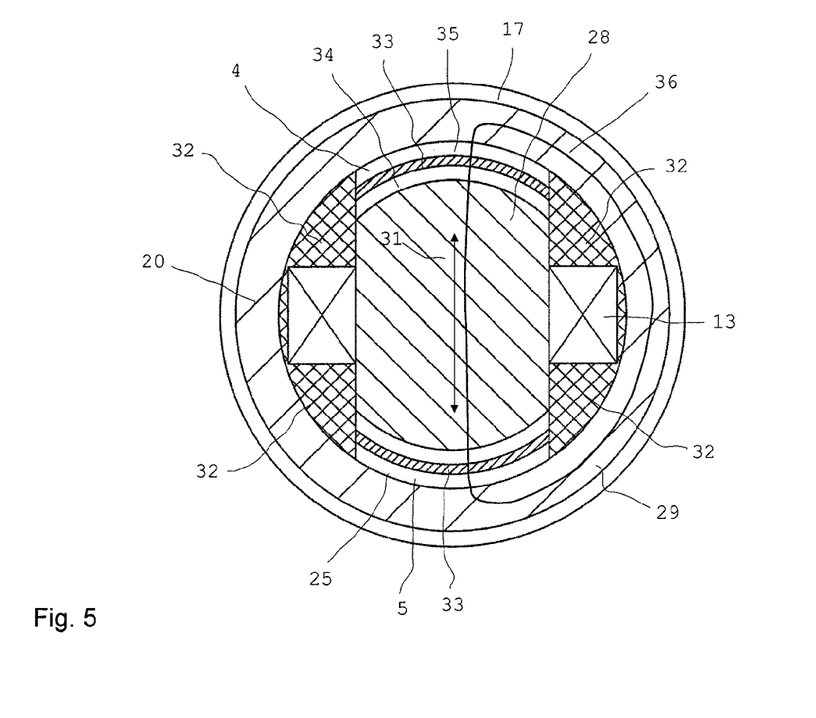
FIG. 5 a cross-section of the damper device according to FIG. 1.

The end of the central piston rod 27 is provided with the damper piston 18 which comprises a magnetic device 10 having at least one core 28 (see FIG. 5).

For sealing the damper piston 18 in the damper body 17 a piston ring may be provided as a sealing. Or else it is conceivable for the magnetic field of the magnetic device 10 to cause complete sealing from the damper housing 17 since the magnetic field of the magnetic device 10 causes chain-forming of the particles in the ferromagnetic fluid so as to allow sufficient sealing.

The core 28 of the magnetic device 10 is enveloped in a coil 13 as the magnetic field-generating device 8. The core 28 consists at least in part of a hard magnetic material having a coercitive field strength higher than 1000 A/m and in particular higher than 10000 A/m. Presently the core consists entirely of alnico which has a high coercitive field strength and is very temperature resistant. It is an advantage for only one or some parts of the core to be hard magnetic to cut down on the magnetization steps required.

Figure 2:
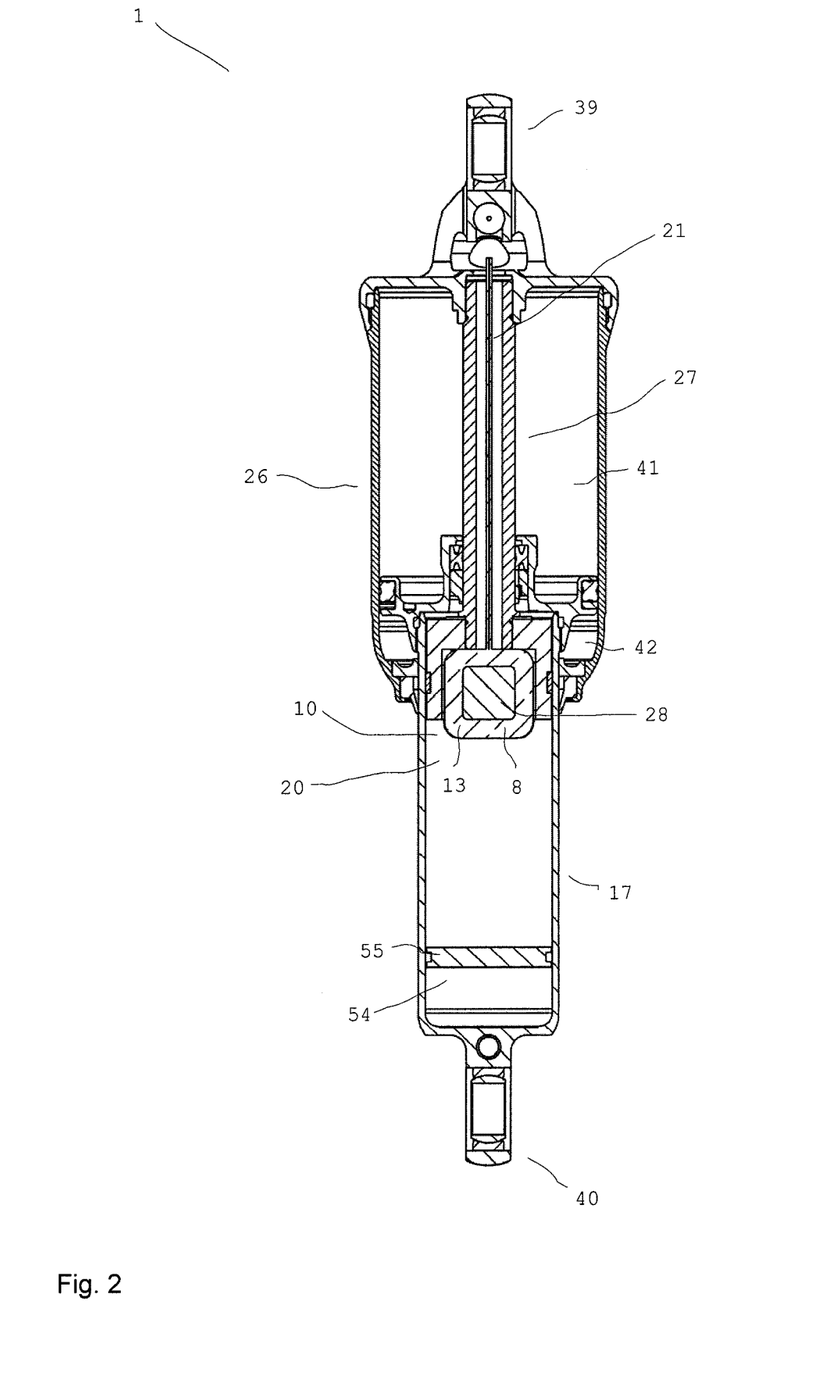
FIG. 2 another sectional side view of the damper device according to FIG. 1.

FIG. 2 illustrates a longitudinal section through the damper device 1 wherein the present longitudinal section is perpendicular to the illustration according to FIG. 1.

One can clearly see in the illustration according to FIG. 2 by the damper piston configured as a valve 20 how the electric coil 13 envelops the hard magnetic core 28 of the magnetic device 10. In this way it is ensured that as the electric coil 13 generates a magnetic pulse, a maximum effect on the hard magnetic core 28 is generated so as to achieve reliable setting and changing of the magnetic field strength of the magnetic device 10.

The illustration according to FIG. 2 clearly shows the control and energy lines 21 by means of which the energy required for the electric coil 13 is supplied and control, carried out. Optionally it is also possible for the control device 14 (see FIG. 4) to be provided within the damper device 1 such that then the lines 21 serve for energy supply only.

The differential spring 54 is typically filled with a gas and is separated from the damper chamber 3 through a floating piston 55. The differential spring 54 serves for equalizing the volume when the piston rod 27 dips into the damper housing 17 since then the entire volume available to the ferromagnetic fluid 38 is reduced due to the inserted portion of the piston rod 27.

Figure 3:
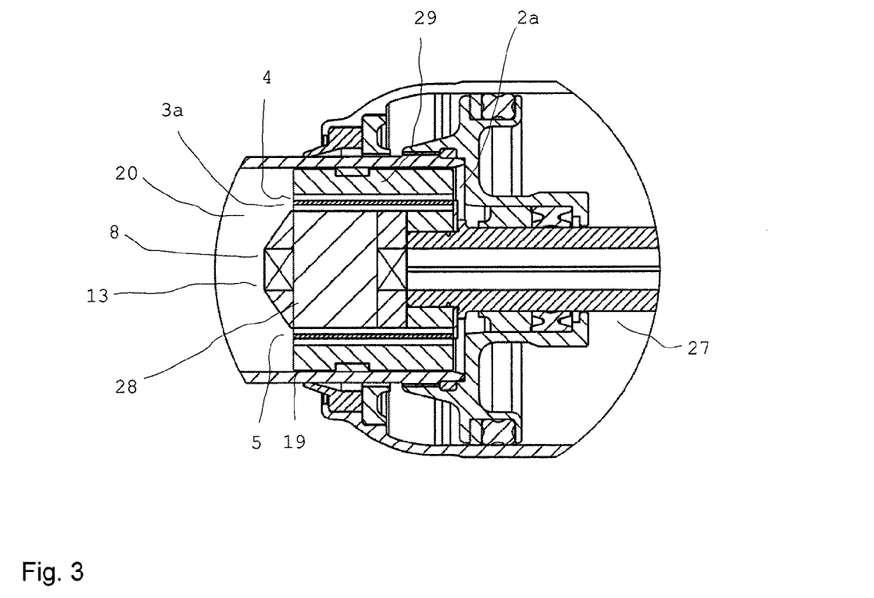
FIG. 3 the detail A from FIG. 1 in an enlarged illustration.

FIG. 3 shows an enlarged illustration of the detail A from FIG. 1.

One can clearly recognize the flow ducts 4 and 5 by means of which the flow connection 6 is made available between the first damper chamber 2 or the first entry 2a and the second damper chamber 3 or the second entry 3a.

The valve 20 presently configured as a damper piston 18 comprises centrally in the middle the core 28 of a hard magnetic material which is enveloped on all sides in an electric coil 13.

The front faces of the core 28 are provided with the flow ducts 4 and 5. Finally the core 28 is radially enveloped in a ring conductor 29 which consists of a magnetically conductive material. Preferably the ring conductor 29 consists of a soft magnetic material. Optionally it may at least in part consist of a hard magnetic material.

The magnetic field of the magnetic device 10 with the hard magnetic core 28 is closed through the ring conductor 29. The field lines of the magnetic field run transverse to the flow ducts 4 and 5 to thus allow to achieve a maximum effect on the ferromagnetic fluid 38.

The drawing shows an embodiment variant in which the flow ducts 4 and 5 and the ring conductor 29 extend over the entire piston length while the core 28 is only approximately half the length. The force area of the damper may be adjusted through the length of the flow ducts 4 and 5 and through the magnetic field strength.

In the illustrated embodiment the field of the core 28 is concentrated in a portion of the flow ducts 4 and 5. Other core shapes allow to set other force areas and characteristic damper curves.

Furthermore a valve is illustrated which as the damper extends, closes off part of the ducts 4 and 5 as needed and thus allows a differentiation of the rebound and compression stages of the damper. A partition wall 33 allows to subdivide the ducts 4 and/or 5 to partial ducts 34 and 35 so as to further enhance efficiency (see also FIG. 5 and the pertaining description). The valve used may for example be a prior art shim having a low spring force.

Separate shims or else quite simple one-way valves may provide separate damping in the rebound and in the compression stages. For example one duct 4 may be provided for damping in the rebound stage only and one duct 5, for damping in the compression stage only (or vice versa). One-way valves at the ducts 4 and 5 then preferably prevent any flow through the corresponding duct in the other of the damping stages. It is also possible to provide two different valves 20 one of which valves 20 comprises at least one duct for damping in the rebound stage and one valve 20, at least one duct for damping in the compression stage. This allows simple, separate control of the damping characteristics in the rebound and compression stages.

Figure 4:
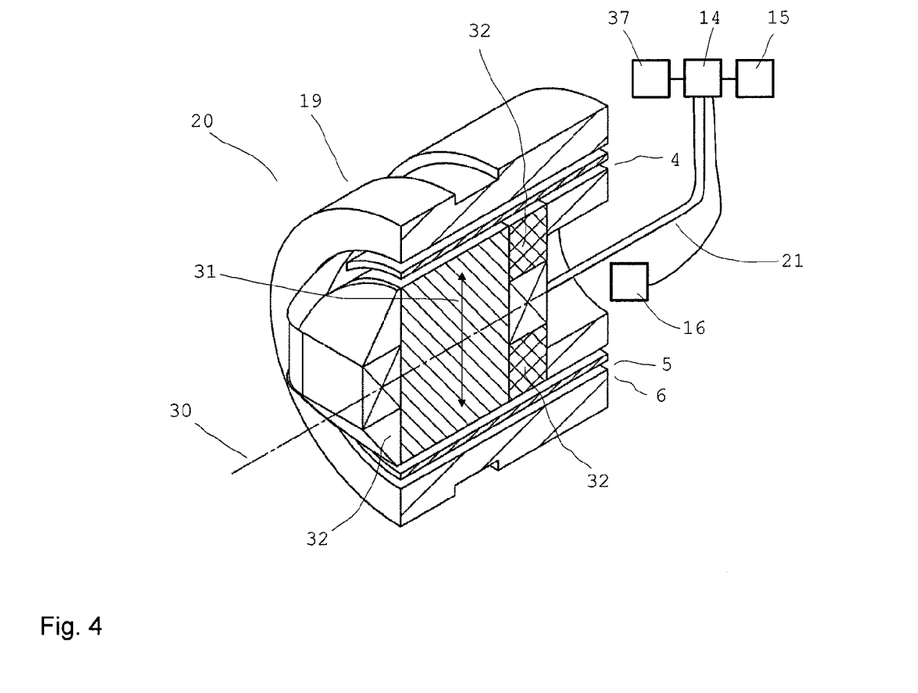
FIG. 4 the valve of the damper device according to FIG. 1 in an enlarged, perspective illustration.

FIG. 4 illustrates a slightly perspective and sectional illustration of the valve 20 wherein the connecting axis 31 of north pole and south pole of the core 28 is indicated in the core 28. For sealing and for directing the magnetic field of the core 28, magnetic isolators 32 are provided in the lateral areas such that the magnetic field generated by the core 28 is not deflected laterally but passes through the flow ducts 4 and 5 substantially perpendicularly. Presently the flow ducts 4 and 5 run approximately in parallel to the longitudinal axis 30 of the damper piston 20. In other configurations the flow ducts 4 and 5 may be provided on the exterior 19 of the damper piston 20.

The FIG. 4 shows a sensor device 16 drawn schematically which may comprise one or more sensors. Preferably a sensor is provided for detecting the magnetic field strength to determine a measure of the strength of the magnetic field generated by the core 28 in the flow ducts 4 and 5. Further sensors are possible such as temperature sensors, viscosity sensors, pressure sensors, and the like. The sensor device 16 is connected with the control device 14 for controlling the magnetic pulses emitted through the lines 21.

The electric energy required for a magnetic pulse is provided by a capacitor device 15 having one or more capacitors. A capacitor device 15 allows to provide the energy required for a magnetic pulse even with a power supply having only low voltage and low performance to achieve magnetization or demagnetization of the core 28.

An oscillator circuit device 37 may be provided to ensure defined demagnetization of the core 28. An attenuating alternating magnetic field is applied to the core 28 to thus achieve demagnetization.

FIG. 5 shows a cross-section of the damper device 1 with the valve 20, where for better understanding a field line 36 of the magnetic field generated by the core 28 is inserted.

It can be clearly seen that in the area of the flow ducts 4 and 5 the field lines 36 pass through the gap nearly perpendicularly (normal relative to the pole faces). This causes chain formation of the ferromagnetic particles along the field lines 36 so as to achieve maximum damping in the flux direction of the flow ducts 4 and 5.

The central core 28 presently consists of alnico as a hard magnetic material and comprises a polarization of north pole in the direction of the south pole along the connecting axis 31. In the direction of the ends of the connecting axis 31 flow ducts 4 and 5 are provided which are presently configured gap-like and which are again subdivided by partition walls or fan-like elements 33 in the direction of the gap width 45 (see FIG. 8) so as to obtain partial ducts 34 and 35 at the flow ducts 4 and 5.

The partition wall 33 preferably consists of a good magnetic conductor such that the partition wall only represents low magnetic resistance. Optionally the partition walls 33 may consist of a hard magnetic material and be magnetized permanently but changeable by the magnetic pulses of the coil 13.

On both sides of the core 28 one can see in the illustration according to FIG. 5 the coil 13 which envelops the entire core 28. The sides are additionally provided with magnetic isolators 32 which in these areas much reduce the strength of the magnetic field present there since the magnetic field lines follow the smallest resistance, extending through the core 28 and the ring conductor 29.

In preferred configurations the cross-sectional areas 25 of the flow ducts 4 and 5 may be adjustable for example by way of mechanical adjustment such that the cross-sectional area 25 can be adapted correspondingly.

The valve 20 is presently formed by the ring conductor 29, the core 28 received therein, the coil 13 and the magnetic isolators 32, and the flow ducts 4 and 5.

In the presently illustrated embodiment the valve 20 is disposed longitudinally displaceable in the damper housing 17 as the damper piston 8.

It is advantageous to manufacture of alnico only that portion of the magnetic device 10 that is required to allow maintaining a specific field strength and flux density in the remaining part of the magnetic device 10. For example only a portion of the core 28 may be of alnico and the remainder may consist of another ferromagnetic material.

Or else it is conceivable to manufacture the entire magnetic device 10 of a material having hard magnetic properties. For example if in FIG. 5 the core 28 and the ring conductor 29 are manufactured for the most part of a hard magnetic material, then its coercitive field strength may be smaller than with only part of the core 28 consisting of a hard magnetic material.

Figure 6:
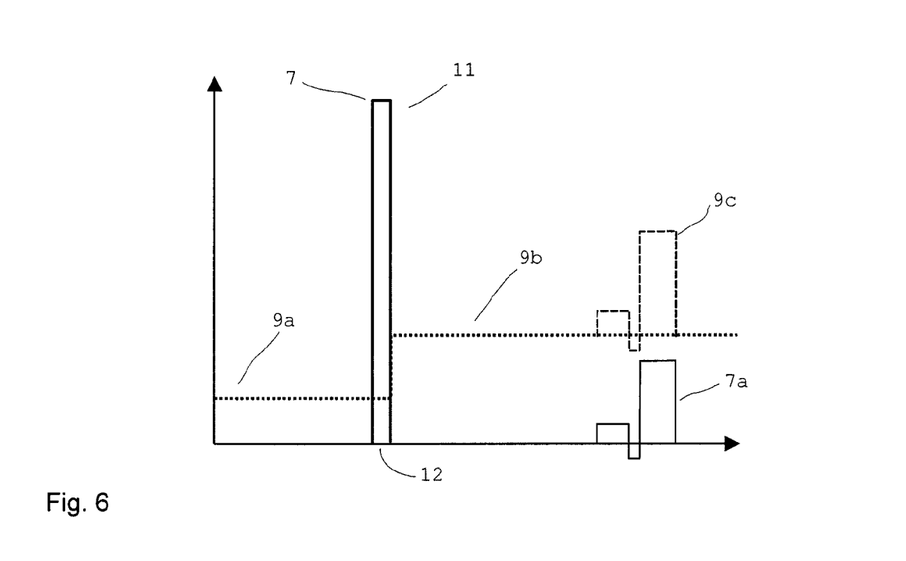
FIG. 6 a schematic time diagram of the magnetic field strength.

FIG. 6 shows the operating principle in changing or setting a desired magnetic field strength 9 from a first magnetic field strength 9a to another magnetic field strength 9b. What is shown is the strength of the magnetic field 9 over time, wherein the field strength of the core 28 is shown in a dotted line while the magnetic field generated by the electric coil 13 is drawn in a solid line.

It is clearly recognizable that the magnetic field strength 7 generated by the electric coil 13 is zero over most of the time since a magnetic field generated by the electric coil 13 is not required for normal operation and thus no electric energy is required.

A magnetic field 7 generated by the electric coil 13 is required only if a change of the magnetic field strength of the magnetic device 10 is intended.

Thus the magnetic field strength 16 generated by the magnetic device 10 firstly has a lower value until a magnetic pulse 11 is triggered by the electric coil 13, wherein the magnetic field strength 7 generated by the electric coil 13 has a corresponding strength to permanently magnetize the hard magnetic core 28 at a corresponding strength.

For example the magnetic field strength of the magnet 10 may be increased from an initially lower field strength 9a to a correspondingly higher field strength 9b to cause a more intense damping or to close the valve 20.

While the pulse length 12 for the magnetic pulse 11 is very short and may lie in the range of a few milliseconds, the magnet or the magnetic device 10 subsequently has the permanent, high field strength 9b which, given a correspondingly magnetic field strength 7 of the magnetic pulse 11, may extend until saturation of the hard magnetic material used. The magnetic field strength 7 generated by the coil 13 during the magnetic pulse 11 causes a permanent change of the magnetic field strength of the magnet 10 of an initial magnetic field strength 9a to a magnetic field strength 9b.

In FIG. 6 one can see that the amount of energy saved over a conventional system requiring current continuously, depends on the frequency of remagnetizations. However, even in the case of frequent remagnetization, for example once every second, the current requirement is lower than in a similar prior art damper. When remagnetization is activated only as needed, for example as road conditions change, then the advantage over other systems is much clearer still.

When the core 28 is magnetized to a correspondingly lower level, a correspondingly weak magnetic field 9 is generated. Demagnetization can be generated—as described above—by way of an attenuating alternating magnetic field.

Furthermore FIG. 6 schematically shows on the right in the diagram a situation in which the coil 13 is also used for time-based modification of the active magnetic field 9c. When the coil 13 is only subjected to a magnetic field 7a that is weak and e.g. variable over time, as shown on the right in FIG. 6 in a solid line, then the magnetic field 9c active on the whole is influenced correspondingly and is intensified or attenuated, depending on the polarization. This also enables a dynamic influence on the active magnetic field 9c without changing the permanent magnetization of the magnetic device 7 (field strength 9b).

Figure 7:
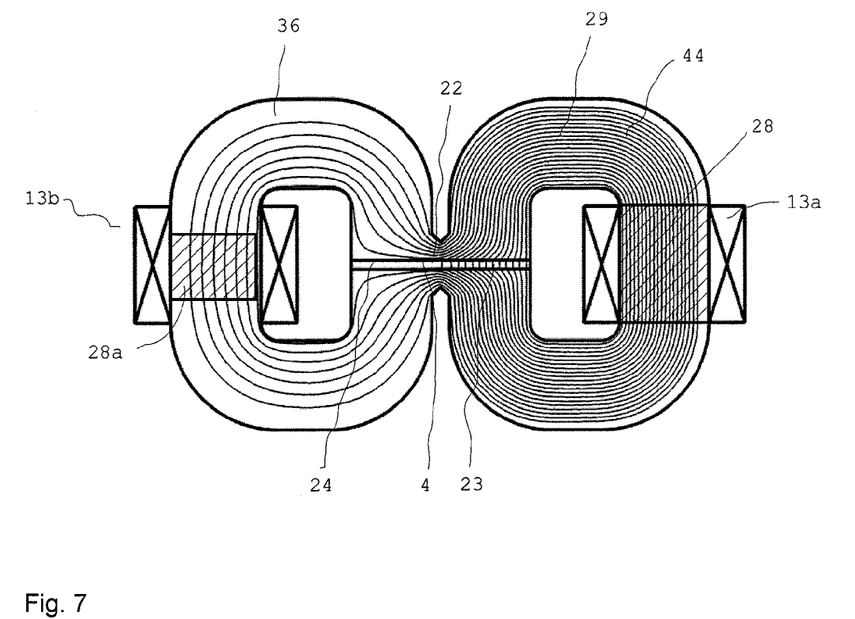
FIG. 7 a schematic illustration of an alternative valve.
Figure 8:
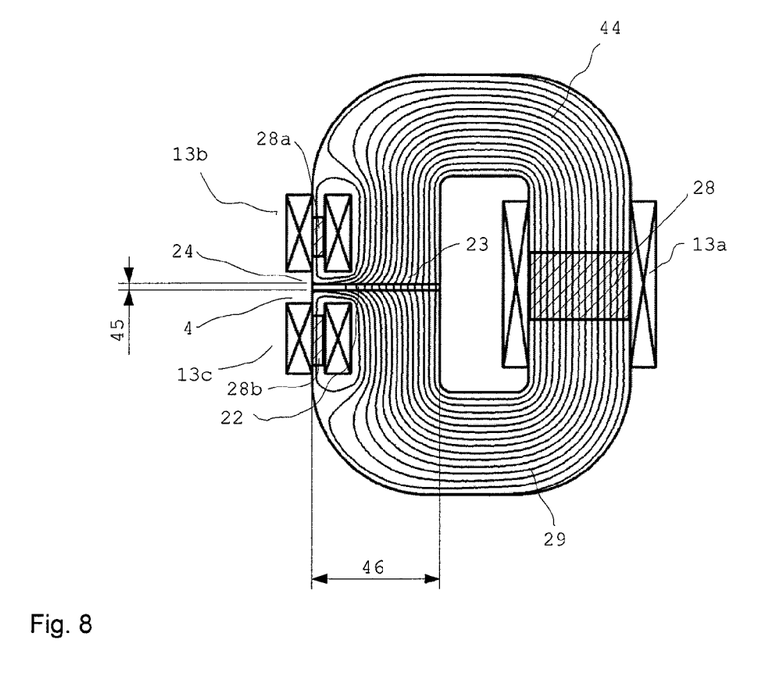
FIG. 8 a schematic illustration of another valve.

FIGS. 7 and 8 show further schematic embodiments with two electric coils 13a and 13b (FIG. 7) or three electric coils 13a, 13b and 13c being employed in conjunction with corresponding cores 28, 28a, or 28, 28a and 28b.

In FIG. 7 a central flow duct 4 is provided with C-shaped elements provided on both sides which combined generate the ring conductor 29. The right and left halves can firstly be considered separately. The magnetic field generated in the right half by the core 28 is directed by the ring conductor 29 up to the flow duct 4 which is presently configured gap-like.

In the flow duct 4 a ferromagnetic fluid 38 is provided which presently is subjected to an intense magnetic field by the core 28 in the region of the right half. In this way a blocking section 23 is generated on the right half where the flow is damped maximally.

The left half of the flow duct 4 is substantially influenced by the magnetic field of the second core 28a. In the present embodiment the core 28a generates a weak field which is polarized opposite to the field of the core 28, as follows from the density of the field lines 36 of the magnetic field 44 which are clearly recognizable graphically. In this way part of the field is short-circuited by the core 28 over the core 28a, there is no field in the left area of the flow duct 4. In the center of the flow duct 4 the transition section 22 forms in which the field strength increases to the right in the direction of the core 28.

By way of changing the magnetic fields through magnetic pulses 11 of the electric coils 13a and 13b the magnetic fields generated by the cores 28 and 28a may be influenced correspondingly so as to allow to configure the entire flow duct 4 as a blocking section 22, or else to configure the entire flow duct 4 as a bypass section 24.

When a corresponding control sets different magnetization strengths and polarizations of the cores 28 and 28a, then a broad transition section 22 may be set which results in a smooth transition from the low speed to the high speed range. The field curve in the flow duct 4 may be adjusted in a wide adjusting range. The setting done by at least one pulse is permanently maintained absent any electric supply.

Any desired portion of the cores 28 and 28a or of the ring conductor 29 may be manufactured of a hard magnetic material, the portion enveloped in the coils 13a and 13b is most suitable since this is where particularly high and homogeneous fields can be achieved.

In FIG. 8 a schematic solution is illustrated with three cores 28, 28a and 28b with appertaining electric coils 13a, 13b and 13c wherein different magnetization settings result in highly variable conditions for the flow duct.

The sum of the individual fields of the cores 28, 28a and 28b amounts to a total field which flows through the flow duct 4. As described for FIG. 7, the shape of the field influences the characteristic damper curve 65. The core 28 is the main core, it determines the strength of the field of the magnetic device 10. The cores 28a and 28b can influence the field of the magnetic device in the flow duct 4.

When the polarization of the cores 28a and 28b is the same as that of the main core 28, then a homogeneous magnetic field 44 prevails in the flow duct 4 the strength of which depends on the magnetization of all of the cores. When the polarization of the cores 28a and 28b is inverse that of the main core 28, then an inhomogeneous magnetic field can form in the flow duct 4. This allows to form different sections such as bypass section 24, transition section 22, and blocking section 23. The shape of the sections depends on the magnetization of each of the cores and may be adjusted over a wide range. It is also conceivable to polarize the two cores 28a and 28b inversely (one of these then being polarized the same as the main core 28). This allows to further extend the adjustment range of the damper 1.

Unlike in FIG. 7, the hard magnetic material must be disposed in the range of the coils 13a, 13b and 13c to be able to generate a specific field in the flow duct 4 when currentless. Alternatively at best the ring conductor 29 may comprise hard magnetic properties in the partial range directly adjacent to the flow duct.

Again the gap width 45 of the flow duct 4 is considerably narrower than is the gap length 46, with the ratio of gap length 46 to gap width 45 exceeding the factor 2 and being in particular higher than 5 or even higher than 10.

Figure 9:
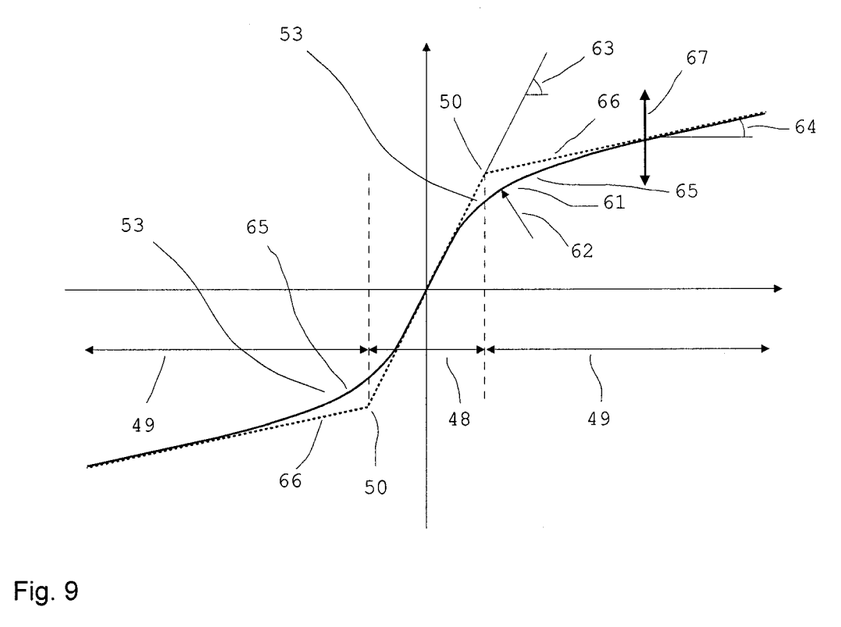
FIG. 9 the characteristic curve of a valve with a transition section.

A characteristic damper curve 65 of the damper device 1 with the valve 20 is illustrated in FIG. 9 in a force-speed diagram of the damper piston. The low-speed range 48 and the high-speed range 49 are connected with a radius 62 through a smooth rounding 61. The characteristic curve according to FIG. 9 is structured symmetrically, showing the same curve for the rebound and the compression stages. Basically though, different curves of the two stages are possible and desired.

In the low-speed range 48 the gradient 63 of the characteristic damper curve is substantially determined by the bypass section 24. In the high-speed range 49 the gradient 64 is substantially determined by the entire flow duct 4 and 5 and the strength of the field in the blocking section 23.

In the transition range 22 over the extension of which an attenuating magnetic field is active, the advantageous, non-linear contour leads to the rounding 61 which leads to a comfortable and safe operation.

What is also drawn in is an arrow 67 showing the effect of a magnetic field having different strengths. Given a more intense magnetic field and in particular a more intense magnetization of the core 28, the characteristic curve shifts upwardly while given a weaker magnetic field and in particular a weaker magnetization it shifts downwardly.

Dotted lines show a characteristic damper curve 66 which would be present without any transition range 22 if, other than the ferromagnetic flow duct 4 or 5, an additional bypass duct were provided. In such a damper the resistance in the flow ducts 4 and 5 would be overcome at the break point 50 and the damping level would change instantaneously which might lead to undesirable riding characteristics when employed in a bicycle. The gradient in the low-speed range 48 is adjustable by means of the portion of the bypass section 24. The larger the bypass section 24, the smaller the gradient. The zero passage is again generated by the bypass section 24 since damping fluid can at all times flow through the bypass section 24 without being influenced such that damper piston movement will already be triggered by weak forces.

The gradient in the high-speed range 49 is influenced by the shape of the entire flow duct 4 and 5 and the set strength of the magnetic field 9 in the blocking section 23.

The area with the rounding 61 which is significant for comfort and safety is rounded by way of the transition range 22 of the flow duct 4 or 5 so as to enable an ergonomic and safe operation. The extent of the rounded area ensues from the size and shape of the transition section 22 which can be flexibly adjusted by corresponding adjustment of the strength of the magnetic fields of the cores 28, 28a, 28b (and possibly still more cores). Power supply by means of a generator, dynamo or in particular a hub dynamo is conceivable as well.

LIST OF REFERENCE NUMERALS:

1 damper device
2, 3 damper chamber 2a, 3a first and second entries
4, 5 flow duct
6 flow connection
7, 7a magnetic field strength of the magnetic field-generating device
8 magnetic field-generating device
9, 9a, 9b magnetic field strength of the magnetic device
9c active magnetic field strength
10 magnetic device, magnet
11 magnetic pulse
12 pulse length
13, 13a, 13b, 13c electric coil
14 control device
15 capacitor device
16 sensor device
17 damper housing
18 damper piston
19 exterior
20 valve
21 control and energy lines
22 transition section
23 blocking section
24 bypass section
25 cross-sectional area
26 spring device
27 piston rod
28, 28a, 28b core
29 ring conductor
30 longitudinal axis
31 connecting axis
32 isolator
33 partition wall, fan-shaped element
34, 35 partial duct
36 magnetic field line
37 oscillator circuit device
38 ferromagnetic fluid
39 first end
40 second end
41, 42 spring chamber
44 magnetic field
45 gap width
46 gap length
47 gas piston
48 low-speed range
49 high-speed range
50 break point
54 differential spring
55 floating piston
61 rounding
62 radius
63, 64 gradient
65 characteristic damper curve
66 high-speed range gradient
67 characteristic damper curve range

The invention claimed is:

1. A damper device for a two-wheeled vehicle and in particular a bicycle, comprising: at least one first damper chamber and at least one second damper chamber coupled to one another through at least one flow duct provided with at least one ferromagnetic fluid, at least one magnetic device is provided to allow exposing at least part of the flow duct to a magnetic field, and that at least one magnetic field-generating device is provided with which by means of at least one magnetic pulse a permanent change of the magnetic field strength of the magnetic device is achievable.

2. The damper device according to claim 1, wherein the permanent magnetization of the magnetic device can be set by at least one magnetic pulse of the magnetic field-generating device to any desired value between zero and the remanence wherein the polarity of the magnetization can in particular be changed.

3. The damper device according to claim 1, wherein a control device is provided for controlled emission of magnetic pulses of the magnetic field-generating device wherein the magnetic field-generating device comprises at least one electric coil.

4. The damper device according to claim 1, wherein the magnetic device can generate a static magnetic field which can be superimposed by a dynamic magnetic field of the magnetic field-generating device without thereby changing the static magnetic field.

5. The damper device according to claim 1, wherein at least one capacitor device is provided to provide the electric energy for generating at least one magnetic pulse.

6. The damper device according to claim 1, wherein at least one sensor device is provided.

7. The damper device according to claim 1, wherein the magnetic device is structured to generate a magnetic flux density of at least 0.3 tesla in the flow, wherein the magnetic device includes at least one of: a material having a coercitive field strength of higher than 1 kA/m, a material having a coercitive field strength of less than 1000 kA/m and a material taken from a group of materials comprising, alnico, CuNiFe, FeCrCo, FeCoVCr, SmCo, NdFeB, FeCr, FeCoVCr and neodymium.

8. The damper device according to claim 1, wherein the flow duct can be exposed to an inhomogeneous magnetic field and wherein in particular the flow duct comprises at least one transition section and at least one blocking section and/or at least one bypass section wherein in particular a cross-sectional area of the flow duct is adjustable and/or wherein at least a portion of the transition section and/or of the bypass section is adjustable at the cross-sectional area of the flow duct.

9. The damper device according to claim 1, wherein at least part of the magnetic device is movable relative to the flow duct.

10. The damper device according to claim 1, wherein at least part of the magnetic device is disposed adjacent to the coil or enveloped by the coil and/or wherein at least one flow duct is disposed adjacent to the core.

11. The damper device according to claim 1, wherein the core, the coil and the at least one flow duct are enveloped by a magnetically conductive ring conductor and/or wherein the flow duct abuts the core, the ring conductor and at least one lateral magnetic isolator.

12. The damper device according to claim 1, wherein at least two coils are provided which can be in particular selected separately.

13. The damper device according to claim 1, wherein an oscillator circuit device is provided to generate an attenuating alternating magnetic field.

14. The damper device according to claim 1, wherein the first damper chamber and the second damper chamber are disposed at least in part in a shared damper housing and are separated from one another by at least one damper piston which damper piston in particular comprises a core comprising at least part of the magnetic device.

15. A method of operating a damper device in particular for a bicycle having at least one first damper chamber and at least one second damper chamber which are coupled to one another through at least one flow duct, comprising: providing at least one ferromagnetic fluid wherein at least one magnetic device is assigned to the flow duct to expose the flow duct to a magnetic field of the magnetic device, wherein by means of magnetic pulses of a magnetic field-generating device the magnetic field strength of the remanence device of the magnetic device is permanently changed.

\* \* \* \* \*